United States Patent [19]

Brown

[11] 4,257,487
[45] Mar. 24, 1981

[54] WATER STOP ATTACHMENT AND BORDER DISC

[76] Inventor: Manuel D. Brown, 21855 Walnut St., Riverdale, Calif. 93627

[21] Appl. No.: 4,052

[22] Filed: Jan. 16, 1979

[51] Int. Cl.³ .............................................. A01B 49/02
[52] U.S. Cl. .................................... 172/140; 172/178; 172/200; 172/440
[58] Field of Search ............... 172/178, 179, 180, 200, 172/195, 197, 199, 175, 177, 187, 72, 201, 600, 601, 603, 582, 440, 442, 441, 451, 176, 701, 140, 181

[56] References Cited

U.S. PATENT DOCUMENTS

| 1,692,879 | 11/1928 | Willey | 172/181 |
|---|---|---|---|
| 2,193,275 | 3/1940 | Elliott | 172/143 |
| 2,499,746 | 3/1950 | Grenier | 172/177 |
| 2,596,579 | 5/1952 | McKay | 172/440 |
| 2,643,600 | 6/1953 | Rinderknecht | 172/491 |
| 2,671,973 | 3/1954 | Bensel | 172/479 |
| 2,673,434 | 3/1954 | Babinchak | 172/178 |
| 2,749,694 | 6/1956 | Klemm | 172/440 |
| 3,065,802 | 11/1962 | Nikkel | 172/237 |
| 3,224,392 | 12/1965 | Mellen | 172/440 |
| 3,235,013 | 2/1966 | Kirkpatrick | 172/600 |
| 3,275,341 | 9/1966 | Ralston | 172/451 |

OTHER PUBLICATIONS

Miller Series III Offset Discs Advertising Brochure, Miller Mfg. Co., Stratton, Neb.

Primary Examiner—Richard J. Johnson
Attorney, Agent, or Firm—Harvey B. Jacobson; Clarence A. O'Brien

[57] ABSTRACT

The device comprises a transverse frame member having depending border disc mounts. The transverse frame member also has a hitch extending forwardly therefrom for attachment to a three point hitch on a tractor. The water stop attachment has a ladder type framework with one side of the ladder frame pivotally attached to the border disc transverse frame member. A spaced parallel frame member of the ladder frame is attached to a plurality of stop plates which are located directly behind the depending border disc mounts. A single hydraulic cylinder extends between a raised portion of the three point hitch and a central member of the ladder frame for raising and lowering the stop mechanism upon actuation of a hydraulic switch or valve located in the cab of the tow vehicle.

5 Claims, 7 Drawing Figures

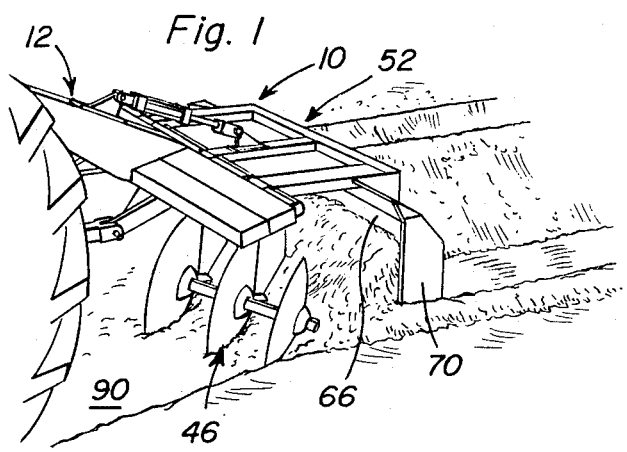
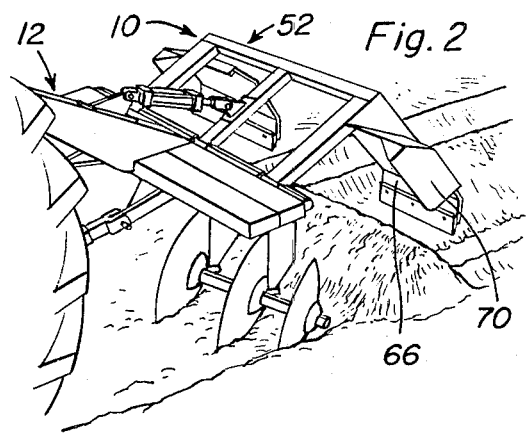
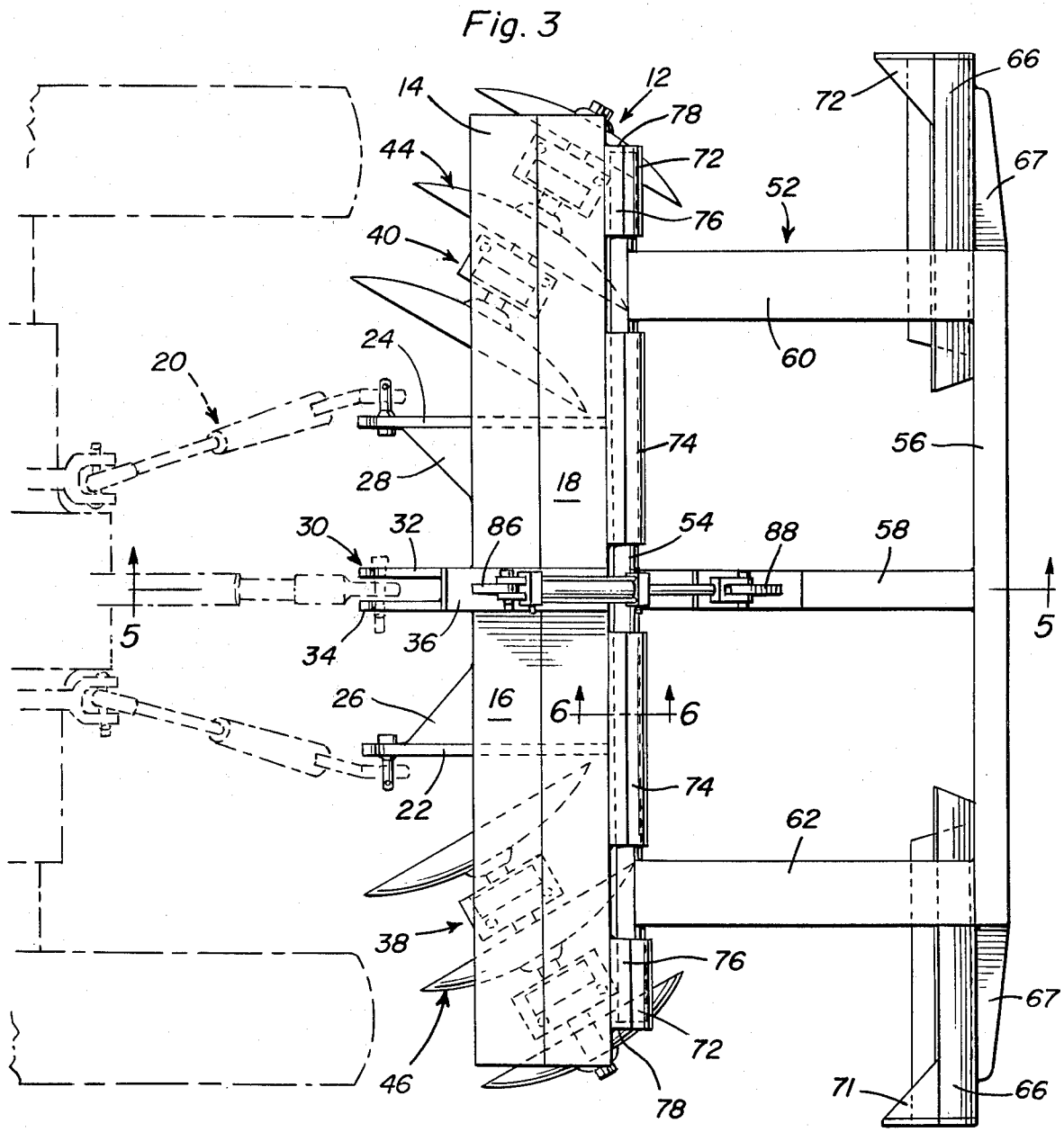

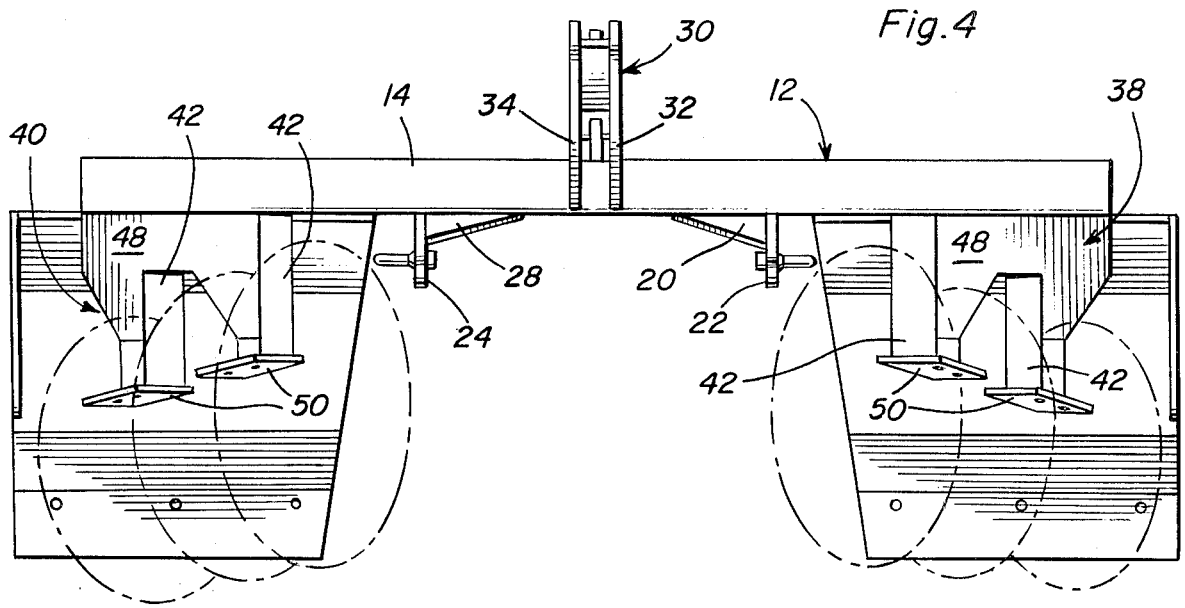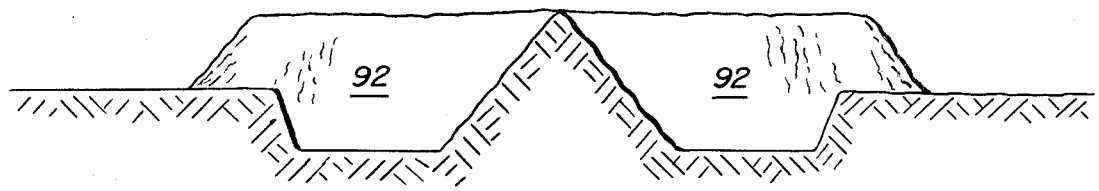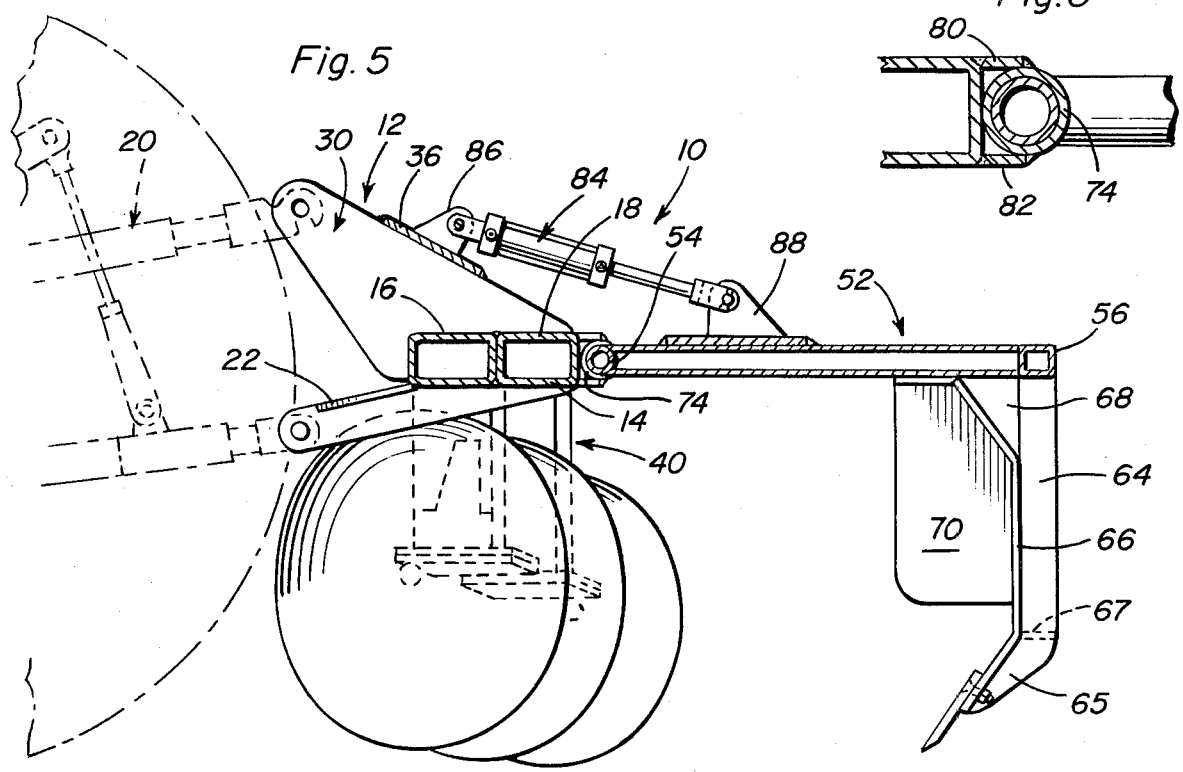

WATER STOP ATTACHMENT AND BORDER DISC

BACKGROUND OF THE INVENTION

1. Field of the Invention

This invention relates to a simplified border disc and water stop attachment therefor.

2. Description of the Prior Art

In the farming industry, it is often necessary to provide dikes or dams in pre-dug irrigation furrows in order to hold water stationary thus conserving water deposited therein and also reducing the effects of erosion caused by the rapid passing of rain water and the like through the furrows. Many implements have been proposed for use in forming such dams or dikes. U.S. Pat. No. 1,692,879, issued Nov. 27, 1928, to Willey, shows a ground checker having a six-sided frame on which a pair of wheels is mounted for supporting the checker, a group of depending blades are mounted for breaking up the ground and a pivotal transverse blade is attached for producing dams. U.S. Pat. No. 2,193,275, issued Mar. 12, 1940, to Elliott, shows a dammer attachment for furrow seeders. The Elliott device includes manually operated depending blades for producing dams of various heights in furrows after the furrows have been seeded. The Elliott device contains a complicated linkage to effect the desired result. U.S. Pat. No. 2,671,973, issued Mar. 16, 1954, to ten Bensel, shows a land leveler attachment for use with a conventional implement carriage. The ten Bensel device includes a scrapper for levelling land. The scrapper is mounted to a frame which is supported on a pair of wheels and is towed behind a tractor. The blade is pivotally mounted to the frame and may be pivoted by use of a hydraulic cylinder. U.S. Pat. No. 3,065,802, issued Nov. 27, 1962, to Nikkel, shows an automatic border blocker including a plurality of border discs for breaking soil, and stop discs disposed behind the border discs for producing mounds. The stop discs are automatically rotated individually about their mounting axes for producing the mounds.

SUMMARY OF THE INVENTION

An object of the present invention is to provide a simple, economical yet effective device for producing dams or dikes in pre-dug furrows.

Accordingly, an additional object of the present invention is to provide a water stop attachment having a minimum number of moving parts.

A further object of the present invention is to provide a water stop attachment pivotally mounted to a border disc device wherein the pivotal attachment is designed to distribute the stress along a large area in order to insure long life of the device.

Yet a still further object of the invention is to provide a water stop attachment and border disc which can be mounted on a three point hitch of a tractor such that the entire combination may be lifted from the ground.

Furthermore, an object of the present invention is to provide a hydraulic cylinder attached between the water stop mechanism and the border disc device such that the water stop mechanism may be individually lifted from the ground when desired.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the device of the present invention shown forming a dam.

FIG. 2 is a perspective view of the device of the present invention shown disengaged from the formed dam.

FIG. 3 is a plan view of the device of the present invention.

FIG. 4 is an elevational view of the border disc mechanism of the present invention.

FIG. 5 is a sectional view taken substantially along a plane passing through section line 5—5 of FIG. 3.

FIG. 6 is a sectional view taken substantially along a plane passing through section line 6—6 of FIG. 3.

FIG. 7 is an elevational front view of a dam formed by the device of the present invention.

DESCRIPTION OF THE PREFERRED EMBODIMENTS

Now with reference to the drawings, the water stop attachment and border disc of the present invention, generally referred to by the numeral 10, will described in detail. With specific reference to FIGS. 3, 4 and 5, it will be seen that the border disc mechanism 12 comprises a main transverse frame 14 upon which all of the elements of the border disc are mounted. The frame 14 may be formed from a pair of rectangular tubular members 16 and 18. As seen in FIG. 5, these rectangular tubular members are welded in a side-by-side manner, thus forming one continuous frame member. Of course, any other suitable means of providing a single frame member which is approximately one foot in width and seven feet in length would suffice. Frame 14 may be connected to a standard three point hitch 20 at the mounting points provided on the frame. Two of these mounted points are formed by canted mounting members 22 and 24 which comprise flat bars mounted on the lower surface of transverse frame 14. Canted mounting members 22 and 24 are preferably attached at positions spaced longitudinally of the transverse frame member and are welded thereto extending downwardly and rearwardly from the transverse frame member 14. Gusset plates 26 and 28 are also welded, respectively, between canted mounting members 22 and 24 and the transverse frame member 14 and provide rigidity to the mounting members. An upright cantilevered mounting member 30 is formed from a pair of laterally spaced generally triangular plates 32 and 34. Each of these plates is welded to the transverse frame member 14 and extends upwardly and rearwardly of that frame member. A lateral connector plate 36 is welded between plates 32 and 34 thus providing additional rigidity to mounting member 30. The mounting members as described may be attached to the three point hitch 20 by the use of pins as shown or any other suitable connector means.

Mounted in depending relation from the transverse frame 14 are left and right disc mounts 38 and 40. Each disc mount consists of two square tubular members 42 which are welded on one end to the bottom surface of transverse frame 14. Each of the members 42 of each disc mount are laterally aligned with one another with the direction of alignment forming an acute angle with the longitudinal dimension of transverse frame 14 such that the arrangements 44 and 46 mounted thereto extend in converging relation toward the front of the border disc mechanism. A connector plate 48 is also attached between each pair of depending members 42 to provide additional rigidity thereto. A mounting plate 50 is attached to the free end of each member 42 and contains mounting holes therein for attaching the discs 44 and 46 thereto. Disc arrangements 44 and 46 are of a known construction wherein each disc plate is rotatably mounted to a common shaft.

The water stop attachment 52 shown most clearly in FIGS. 3 and 5 comprises a ladder type frame consisting of pipe 54 which is spaced from square tubing 56 by central connecting bar 58, which may also comprise square tubing, and end connecting bars 60 and 62, which may comprise rectangular tubing. Attached in a depending relationship to the tubing 56 are blade support bars 64. Each blade support bar may be welded to member 56 and includes an obliquely offset lower portion 65, thereby allowing the blade support members to conform to the shape of blades 66. Each blade 66 is aligned behind a separate one of the disc arrangements 44 and 46. A gusset plate 68 is attached between each respective frame member, the blade support member and the upper portion of blade 66 for providing support thereto. As shown in the drawings, each blade 66 is formed by producing two oblique bends in a steel plate. However, it should be noted that a continuously curved surface would serve as well. Also attached to each blade 66 is a side plate 70 and a gusset plate 71 is attached between the top edges of the side plate and blade 66. The side plate 70 serves to force the scooped dirt inward along the blade surface. Also, gusset plates 67 may be welded between the blade 66 back surfaces and support members 64, as shown, to give additional support to the blades.

The entire water stop attachment is attached to pivot about pipe 54. The hinge connection allowing this pivotal motion consists of a plurality of pipe pieces disposed concentrically over pipe 54 as seen in FIGS. 5 and 6. These pipe pieces consist of two outer elements 72 and two inner pipe elements 74. These concentric pipe elements may be attached directly to main traverse frame member 14 by means of welding. Additionally, as shown, upper and lower support plates 76 and 78 are attached to the outer pipe elements 72 while upper and lower support plates 80 and 82 are attached to the inner pipe elements. These support plates are welded between main traverse frame 14 and the coaxial pipe elements. In this manner, a relatively extensive hinge surface is provided along which the stress felt by blades 66 may be distributed so as to insure the structural integrity of the entire mechanism.

A hydraulic cylinder 84 is provided for raising and lowering the water stop attachment 52. One end of the cylinder 84 is attached to plate 86 which is welded onto lateral plate 36 of the mount 30. The piston is mounted to a plate 88 which is preferably welded at a position medially of the central connecting bar 58. The cylinder 84 may be operated from a valve located proximate the driver of the tractor to raise and lower water stop attachment.

With reference to FIGS. 1 and 2, it will be seen that in operation the water stop attachment and border disc of the present invention is effective for loosening soil 90 by the action of discs 44 and 46. The blade 66, when in the down position as shown in FIG. 1, scoop the loose dirt. The operator may periodically lift the border disc mechanism, as shown in FIG. 2, thus leaving a series of dams 92 as shown in FIG. 7. As illustrated, the water stop attachment and border disc will produce such dams in two side-by-side trenches at a time as can clearly be seen in FIG. 7. It will also be noted that through the angular orientation of the discs together with the side plates 70, the soil forming the dam 92 is confined to a localized area, thus providing a more compact dam.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An irrigation ditch dam forming apparatus comprising:
    a main transverse frame member comprising a pair of rectangular tubular members permanently affixed in lateral alignment to each other;
    hitch means mounted to said transverse frame member for attachment to the three point hitch of a tractor, said hitch means including at least one vertical mounting plate attached in surmounting relation to said transverse frame member and having one edge thereof inclined forwardly of said transverse frame member;
    border disc apparatus attached to said transverse frame member in depending relation thereto;
    a water stop mechanism comprising a stop frame pivotally connected to said transverse frame, and a plurality of blades attached in depending relation to said stop frame, said stop frame being generally rectangular in shape and including a cylindrical rod frame member as one of the long sides of the rectangle, and further wherein portions of said cylindrical rod are disposed coaxially within tubular sections which are affixed to said transverse frame member said tubular sections covering greater than one-half of the length of said cylindrical rod, the coaxial relationship forming said pivotal connection, a second frame member comprising an elongated tube disposed parallel to said cylindrical rod and constituting the second long side of the rectangle, and three connecting frame members connected between and spaced along said cylindrical rod frame member and second frame member each of said connecting frame members comprising a tube, a lifting means attached between and in surmounting relation to said inclined edge of said mounting plate and said stop frame for causing pivoting of said stop frame.

2. The apparatus of claim 1 and further wherein said hitch means includes a second and third mounting plate attached to said transverse frame member and spaced one on each side of said first mounting plate.

3. The apparatus of claim 1 wherein said tubular sections extend substantially between adjacent ones of said three connecting frame members.

4. The apparatus of claim 2 wherein each of said blades is attached to a blade mounting member, each of said blade mounting members being affixed to said second frame member and one of said connecting frame members in a depending position therefrom.

5. The apparatus of claim 4 and further wherein each of said blades includes an angled face and a side plate member attached normally to said angled face.

* * * * *